US010371534B2

(12) United States Patent
Min et al.

(10) Patent No.: US 10,371,534 B2
(45) Date of Patent: Aug. 6, 2019

(54) APPARATUS AND METHOD FOR SHARING AND LEARNING DRIVING ENVIRONMENT DATA TO IMPROVE DECISION INTELLIGENCE OF AUTONOMOUS VEHICLE

(71) Applicant: Electronics and Telecommunications Research Institute, Daejeon (KR)

(72) Inventors: Kyoung Wook Min, Sejong-si (KR); Jeong Dan Choi, Daejeon (KR); Jun Gyu Kang, Daejeon (KR); Sang Heon Park, Daejeon (KR); Kyung Bok Sung, Daejeon (KR); Joo Chan Sohn, Daejeon (KR); Dong Jin Lee, Daejeon (KR); Yong Woo Jo, Daejeon (KR); Seung Jun Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 66 days.

(21) Appl. No.: 15/602,912

(22) Filed: May 23, 2017

(65) Prior Publication Data

US 2018/0101172 A1 Apr. 12, 2018

(30) Foreign Application Priority Data

Oct. 12, 2016 (KR) ........................ 10-2016-0132079

(51) Int. Cl.
*G01C 21/32* (2006.01)
*G05D 1/02* (2006.01)
(Continued)

(52) U.S. Cl.
CPC ........... *G01C 21/32* (2013.01); *G05D 1/0287* (2013.01); *H04W 4/023* (2013.01); *H04W 4/44* (2018.02);
(Continued)

(58) Field of Classification Search
CPC ................. G01C 21/32; G05D 1/0287; G05D 2201/0213; H04L 67/12; H04L 67/1097
See application file for complete search history.

(56) References Cited

U.S. PATENT DOCUMENTS 9,261,882 B2 2/2016 Kim et al.
9,576,480 B1 * 2/2017 Shoshan ............. G08G 1/0112
(Continued)

FOREIGN PATENT DOCUMENTS

JP 2009006946 A 1/2009
JP 2015110403 A 6/2015
(Continued)

*Primary Examiner* — Yuen Wong
(74) *Attorney, Agent, or Firm* — William Park & Associates Ltd.

(57) ABSTRACT

Provided are an apparatus and method for sharing and learning driving environment data to improve the decision intelligence of an autonomous vehicle. The apparatus for sharing and learning driving environment data to improve the decision intelligence of an autonomous vehicle includes a sensing section which senses surrounding vehicles traveling within a preset distance from the autonomous vehicle, a communicator which transmits and receives data between the autonomous vehicle and another vehicle or a cloud server, a storage which stores precise lane-level map data, and a learning section which generates mapping data centered on the autonomous vehicle by mapping driving environment data of a sensing result of the sensing section to the precise map data, transmits the mapping data to the other vehicle or the cloud server through the communicator, and performs learning for autonomous driving using the mapping data and data received from the other vehicle or the cloud server.

17 Claims, 19 Drawing Sheets

(51) Int. Cl.
*H04W 4/02* (2018.01)
*H04W 4/46* (2018.01)
*H04W 4/44* (2018.01)

(52) U.S. Cl.
CPC ...... *H04W 4/46* (2018.02); *G05D 2201/0213* (2013.01)

(56) References Cited

U.S. PATENT DOCUMENTS

| | | | |
|---|---|---|---|
| 9,643,603 | B2 | 5/2017 | Kawahara et al. |
| 9,725,097 | B2 | 8/2017 | Oguri |
| 2009/0005929 | A1 | 1/2009 | Nakao et al. |
| 2015/0241880 | A1 | 8/2015 | Kim et al. |
| 2015/0355641 | A1 | 12/2015 | Choi et al. |
| 2016/0090099 | A1 | 3/2016 | Oguri |
| 2016/0138924 | A1 | 5/2016 | An |
| 2016/0272199 | A1 | 9/2016 | Kawahara et al. |
| 2017/0106905 | A1 | 4/2017 | Choi et al. |
| 2018/0246907 | A1* | 8/2018 | Thiel ................ G06F 17/30241 |

FOREIGN PATENT DOCUMENTS

| | | | |
|---|---|---|---|
| JP | 2016065819 | A | 4/2016 |
| KR | 101551096 | B1 | 9/2015 |

* cited by examiner

FIG. 2C

| TRACKING ID | SPEED | LANE # | DISTANCE |
|---|---|---|---|
| O1 | 45Km/hr | 2 | 25M |
| O2 | 38Km/hr | 2 | 15M |
| O3 | 40Km/hr | 3 | 20M |
| O4 | 45Km/hr | 3 | 8M |
| ... | ... | ... | ... |

FIG. 3B

<EGO-CENTERED MAPPING DATA>

| | SPEED | LANE # | DISTANCE | LOCATION |
|---|---|---|---|---|
| EGO | 40Km/hr | 2 | | GLOBAL LOCATION |
| O1 | 45Km/hr | 2 | 25M | |
| O2 | 38Km/hr | 2 | 15M | |
| O3 | 40Km/hr | 3 | 20M | |
| O4 | 45Km/hr | 3 | 8M | |
| ... | ... | ... | ... | |

<EGO-CENTERED MAPPING DATA>

$t_n$

TRAJECTORY($t_m$, $t_n$)

APPARATUS AND METHOD FOR SHARING AND LEARNING DRIVING ENVIRONMENT DATA TO IMPROVE DECISION INTELLIGENCE OF AUTONOMOUS VEHICLE

CROSS-REFERENCE TO RELATED APPLICATION

This application claims priority to and the benefit of Korean Patent Application No. 10-2016-0132079, filed on Oct. 12, 2016, the disclosure of which is incorporated herein by reference in its entirety.

BACKGROUND

1. Field of the Invention

The present invention relates to an autonomous driving technique, and more particularly, to an apparatus and method for sharing driving environment data of an autonomous vehicle and performing learning using the shared data.

2. Discussion of Related Art

An existing autonomous vehicle makes a situational judgment and decides an operation according to a certain method. In other words, a situational judgment and an operational decision of an autonomous vehicle for a mission, such as a lane change, driving on a curved road, driving through an intersection, inter-vehicle distance keeping, lane keeping, etc., are performed in certain situations. For example, to perform a lane change (for a left or right turn, passing, or a U-turn), the existing autonomous vehicle makes a judgment and decides an operation when certain conditions of speeds of and distances from a preceding vehicle in a traveling lane and preceding and following vehicles in a target lane are satisfied. Also, speed adjustment on a curved road is decided according to a certain parameter.

However, when such a judgment is made according to a certain condition, it is difficult to flexibly make a situational judgment and flexibly decide an operation. For example, optimal values for the "certain condition" should reflect various situations.

The optimal values may be found by analyzing actual autonomous driving environment data. In other words, it should be possible to execute an optimal driving mission by analyzing and learning big data about execution of the corresponding mission. Such an analysis and learning of big data lead to a gradual improvement in the intelligence of an autonomous vehicle.

SUMMARY OF THE INVENTION

The present invention is directed to providing an apparatus and method for sharing driving environment data of an autonomous vehicle and performing learning to make an optimal situational judgment and decide an optimal operation using the shared data when the autonomous vehicle travels on a road.

According to an aspect of the present invention, there is provided an apparatus for sharing and learning driving environment data to improve the decision intelligence of an autonomous vehicle, the apparatus including: a sensing section configured to sense surrounding vehicles traveling within a preset distance from the autonomous vehicle; a communicator configured to transmit and receive data between the autonomous vehicle and another vehicle or a cloud server; a storage configured to store precise lane-level map data; and a learning section configured to generate mapping data centered on the autonomous vehicle by mapping driving environment data of a sensing result of the sensing section to the precise map data, transmit the mapping data to the other vehicle or the cloud server through the communicator, and perform learning for autonomous driving using the mapping data and data received from the other vehicle or the cloud server.

The driving environment data may include a current location and a speed of the autonomous vehicle, speeds of the surrounding vehicles, and distances between the surrounding vehicles and the autonomous vehicle.

The mapping data may include tracking identifiers (IDs) assigned to the surrounding vehicles, and include speeds and traveling lanes of the surrounding vehicles and distances between the surrounding vehicles and the autonomous vehicle corresponding to the tracking IDs.

The communicator may transmit the mapping data centered on the autonomous vehicle to the other vehicle through vehicle-to-vehicle (V2V) communication or to the cloud server through vehicle-to-cloud server (V2C) communication.

The learning section may generate driving environment mapping data by mapping driving environment data of the other vehicle received from the other vehicle through V2V communication of the communicator and the driving environment data of the autonomous vehicle to the precise map data, determine whether a situational judgment condition of a driving mission is satisfied using the driving environment mapping data, and extract training data to learn the driving mission when the situational judgment condition is satisfied.

The driving mission may include at least one of a lane change, lane keeping, inter-vehicle distance keeping, passing through an intersection, and driving on a curved road.

The communicator may transmit the mapping data of the autonomous vehicle to a cloud storage assigned to the autonomous vehicle in the cloud server.

The learning section may receive a result of learning performed using driving environment data of a plurality of vehicles from the cloud server through the communicator, and use the learning result in learning for autonomous driving.

When it is determined that a driving mission has been executed in the autonomous vehicle according to an operation of a driver of the autonomous vehicle, the learning section may record training data acquired during the execution of the driving mission, merge training data recorded in a plurality of vehicles, and perform learning.

According to another aspect of the present invention, there is provided a method of sharing and learning driving environment data to improve the decision intelligence of an autonomous vehicle, the method including: sensing surrounding vehicles traveling within a preset distance from the autonomous vehicle; generating mapping data centered on the autonomous vehicle by mapping driving environment data of a sensing result to pre-stored precise map data; sharing the mapping data with another vehicle or a cloud server through wireless communication; and performing learning for autonomous driving using the mapping data and driving environment data of the other vehicle received from the other vehicle.

The driving environment data may include a current location and a speed of the autonomous vehicle, speeds of the surrounding vehicles, and distances between the surrounding vehicles and the autonomous vehicle.

The mapping data may include tracking IDs assigned to the surrounding vehicles, and include speeds and traveling lanes of the surrounding vehicles and distances between the surrounding vehicles and the autonomous vehicle corresponding to the tracking IDs.

The sharing of the mapping data may include transmitting the mapping data centered on the autonomous vehicle to the other vehicle through V2V communication or to the cloud server through V2C communication.

The performing of learning may include: generating driving environment mapping data by mapping the driving environment data of the autonomous vehicle and driving environment data of the other vehicle received from the other vehicle through V2V communication to the precise map data; determining whether a situational judgment condition of a driving mission is satisfied using the driving environment mapping data; and extracting training data and learning the driving mission when the situational judgment condition is satisfied.

The driving mission may include at least one of a lane change, lane keeping, inter-vehicle distance keeping, passing through an intersection, and driving on a curved road.

The sharing of the mapping data may include transmitting driving environment mapping data of the autonomous vehicle to a cloud storage assigned to the autonomous vehicle in the cloud server.

The performing of the learning may include receiving a result of learning performed using driving environment data of a plurality of vehicles from the cloud server through V2C communication, and using the learning result in learning for autonomous driving.

The performing of the learning may include, when it is determined that a driving mission has been executed in the autonomous vehicle according to an operation of a driver of the autonomous vehicle, recording training data acquired during the execution of the driving mission, merging training data recorded in a plurality of vehicles, and performing learning.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 2A to FIG. 2C is a first reference diagram illustrating driving environment data of an autonomous vehicle according to an exemplary embodiment of the present invention;

FIG. 3A to FIG. 3C is a second reference diagram illustrating driving environment data of an autonomous vehicle according to an exemplary embodiment of the present invention;

DETAILED DESCRIPTION OF EXEMPLARY EMBODIMENTS

Figure 1:
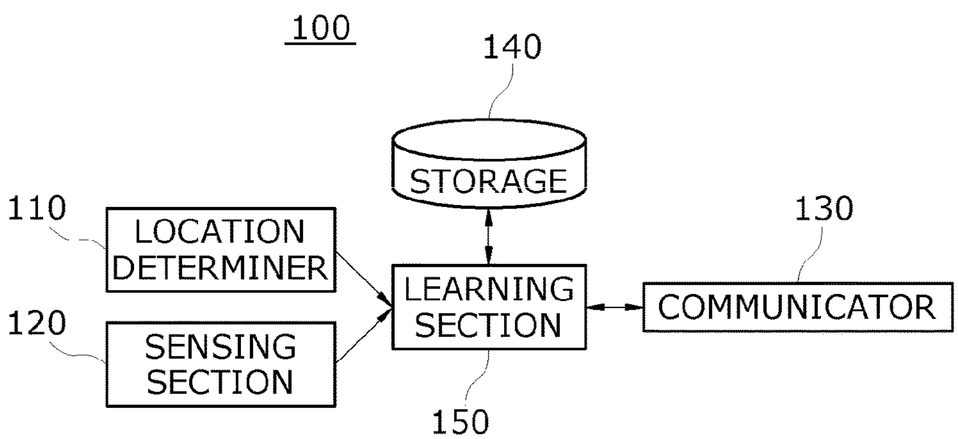
FIG. 1 is a block diagram of an apparatus for sharing and learning driving environment data to improve the decision intelligence of an autonomous vehicle according to an exemplary embodiment of the present invention.

Advantages and features of the present invention and a method of achieving the same should be clearly understood from embodiments described below in detail with reference to the accompanying drawings. However, the present invention is not limited to the following embodiments and may be implemented in various different forms. The embodiments are provided merely for complete disclosure of the present invention and to fully convey the scope of the invention to those of ordinary skill in the art to which the present invention pertains. The present invention is defined by the claims. Meanwhile, terminology used herein is for the purpose of describing the embodiments and is not intended to be limiting to the invention. As used herein, the singular form of a word includes the plural form unless clearly indicated otherwise by context. The term “comprise” and/or “comprising,” when used herein, does not preclude the presence or addition of one or more components, steps, operations, and/or elements other than the stated components, steps, operations, and/or elements.

Hereinafter, exemplary embodiments of the present invention will be described in detail with reference to the accompanying drawings. Like reference numerals are assigned to like components even in different drawings whenever possible. In the description of the present invention, detailed descriptions of well-known configurations or functions will be omitted when the detailed descriptions are determined to obscure the subject matter of the present invention.

FIG. 1 is a block diagram of an apparatus for sharing and learning driving environment data to improve the decision intelligence of an autonomous vehicle according to an exemplary embodiment of the present invention.

As shown in FIG. 1, an apparatus 100 for sharing and learning driving environment data to improve the decision intelligence of an autonomous vehicle according to an exemplary embodiment of the present invention includes a location determiner 110, a sensing section 120, a communicator 130, a storage 140, and a learning section 150.

Although the apparatus 100 for sharing and learning driving environment data may be implemented in both an autonomous vehicle and a human-driven vehicle, an autonomous vehicle will be described as an example below for convenience of description.

The location determiner 110 may determine a global positioning system (GPS) location of the autonomous vehicle using a GPS receiver installed at a certain position in the autonomous vehicle.

The sensing section 120 is installed in the autonomous vehicle and senses obstacles (other vehicles) around the autonomous vehicle. Here, the sensing section 120 may sense other vehicles traveling within a preset distance from the autonomous vehicle. For example, the sensing section 120 may sense preceding and following vehicles traveling in a traveling lane of the autonomous vehicle and other vehicles traveling in left and right lanes. The sensing section 120 may be sensors, such as a laser sensor, an ultrasonic sensor, a light detection and ranging (LiDAR) sensor, and a camera, that are installed at certain positions in front and rear bumpers of the autonomous vehicle.

The communicator 130 may transmit driving environment data of the autonomous vehicle to other vehicles and receive driving environment data of the other vehicles through vehicle-to-vehicle (V2V) communication between the autonomous vehicle and the other vehicles. V2V communication may be existing mobile communication, such as wireless access in vehicular environment (WAVE) or long term evolution (LTE).

Also, the communicator 130 may transmit the driving environment data of the autonomous vehicle and receive driving environment data of other vehicles through vehicle-to-cloud server (V2C) communication between the autonomous vehicle and an infrastructure, such as a cloud server.

Here, the driving environment data may include location coordinates (an x coordinate and a y coordinate) of the autonomous vehicle determined by the location determiner 110, a speed of the autonomous vehicle, a distance between the autonomous vehicle and another vehicle, a speed of the other vehicle, and so on.

The storage 140 stores precise lane-level map data. Here, the precise lane-level map data may be lane-specific road network data. Further, the precise map data of the storage 140 may be subsequently updated according to a learning result of the learning section 150.

The learning section 150 acquires driving environment data, maps the driving environment data to the precise map data, and perform learning for autonomous driving using the mapped data to improve the decision intelligence of the autonomous vehicle.

Specifically, the learning section 150 maps information on obstacles (other vehicles) recognized and tracked by the sensing section 120 to the precise lane-level map data of the storage 140 and thereby maintains driving environment data. Here, driving environment data, such as the location and the speed of the autonomous vehicle, distances between the autonomous vehicle and the other vehicles, speeds of the other vehicles, etc., may be mapped to the precise map data. Accordingly, the mapped data may include tracking identifiers (IDs) assigned to the tracked other vehicles, and include vehicle speeds, traveling lanes, and distance values from the autonomous vehicle corresponding to the tracking IDs.

Figure 2A:
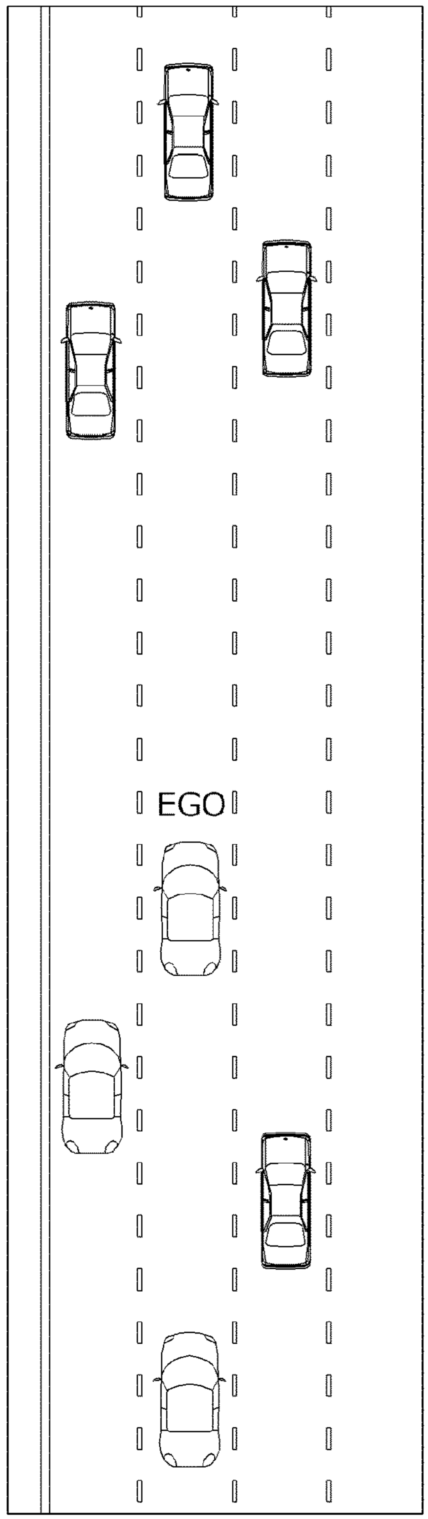
Figure 2B:
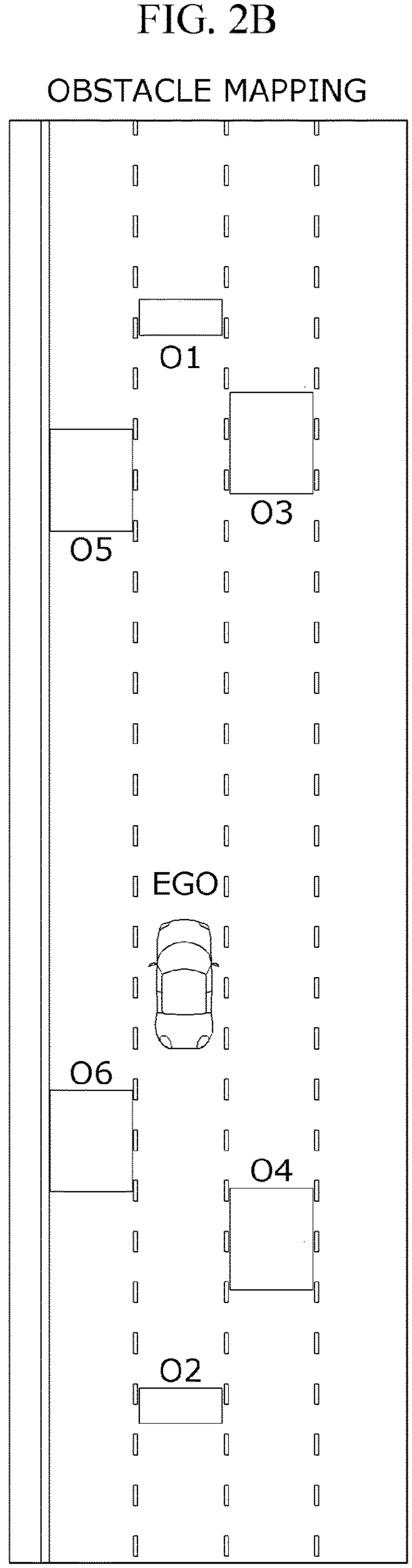

For example, as shown in FIG. 2A, it is assumed that a plurality of vehicles travel around an autonomous vehicle Ego in an environment. In this case, as shown in FIG. 2B, the learning section 150 assigns tracking IDs O1 to O6 to respective other vehicles that are recognized using sensor information of the sensing section 120 and located within a certain distance from the autonomous vehicle Ego. Also, it is possible to detect vehicle speeds (speed), traveling lanes (lane #), and distances (distance) from the autonomous vehicle corresponding to the tracking IDs by mapping the tracking IDs to precise lane-level map data as shown in the table of FIG. 2C.

Figure 3A:
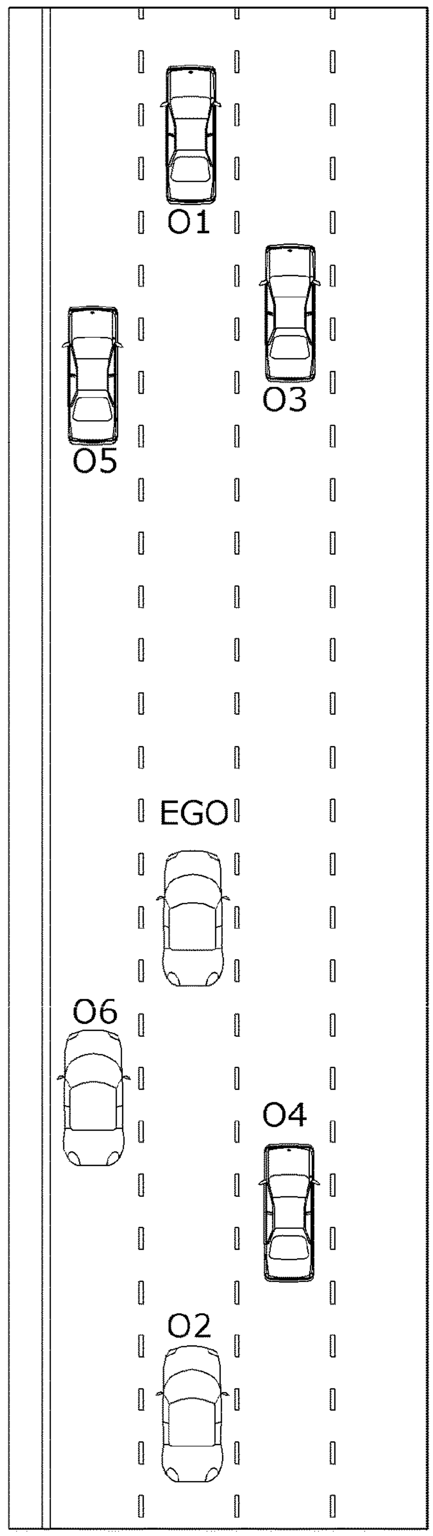
Figure 3C:
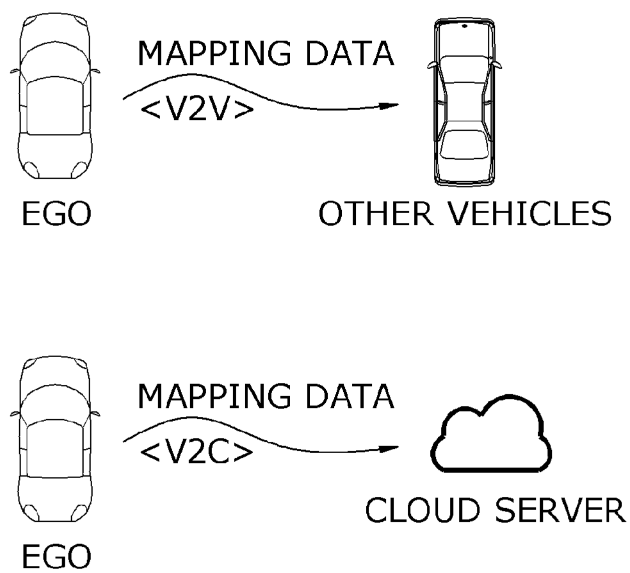

Meanwhile, the learning section 150 may transfer the mapping data obtained by mapping the driving environment data to the precise map data, that is, mapping data centered on the autonomous vehicle, to other vehicles and the infrastructure (the cloud server) and share the mapping data. Specifically, as shown in FIG. 3A, the learning section 150 transmits the mapping data centered on the autonomous vehicle Ego through the communicator 130 and shares the mapping data with other vehicles or the cloud server. Here, as shown in FIG. 3B, the shared mapping data may include a travel speed, a current location, and a traveling lane (an occupied lane) of the autonomous vehicle Ego, travel speeds and traveling lanes of the other vehicles, and distances between the autonomous vehicle and the other vehicles. As shown in FIG. 3C, such mapping data may be transferred to the other vehicles (surrounding vehicles) through V2V communication of the communicator 130 or to the cloud server (the infrastructure) through V2C communication of the communicator 130.

Further, the learning section 150 may receive driving environment data centered on surrounding vehicles (other vehicles) from the other vehicles through V2V communication of the communicator 130. Here, the vehicles (the other vehicles) that transfer the driving environment data through V2V communication may be located within a preset distance (e.g., a V2V communication distance) from the autonomous vehicle. The learning section 150 may receive obstacle information recognized by each of other vehicles $V_i$, $V_j$, . . . , that is, driving environment data of each of the other vehicles, through V2V communication. Alternatively, the learning section 150 may receive mapping data of other vehicles in which driving environment data has been mapped to precise map data of each of the other vehicles through the communicator 130.

Figure 4:
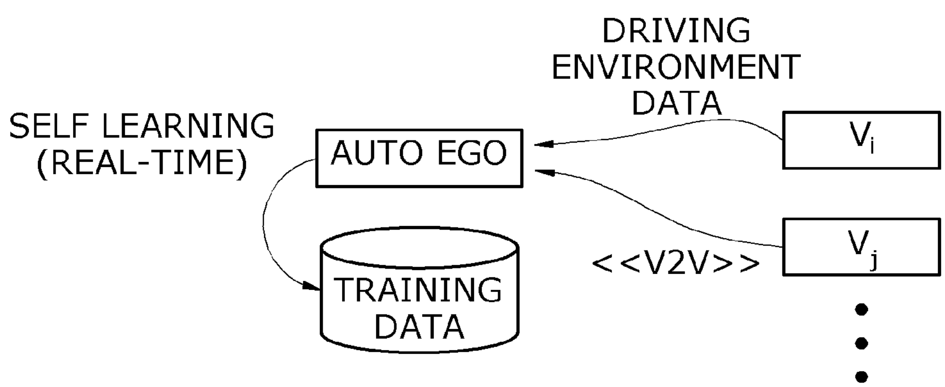
FIG. 4 is a first reference diagram illustrating a learning process using data acquired through vehicle-to-vehicle (V2V) communication according to an exemplary embodiment of the present invention.

Meanwhile, the learning section 150 may perform learning for improving decision intelligence using driving environment data of other vehicles received from the other vehicles and driving environment data of the autonomous vehicle. For example, as shown in FIG. 4, the learning section 150 may perform self-learning on the received driving environment data of the other vehicles $V_i$, $V_j$, . . . in real time and map the driving environment data to the precise map data stored in the storage 140.

Figure 5A:
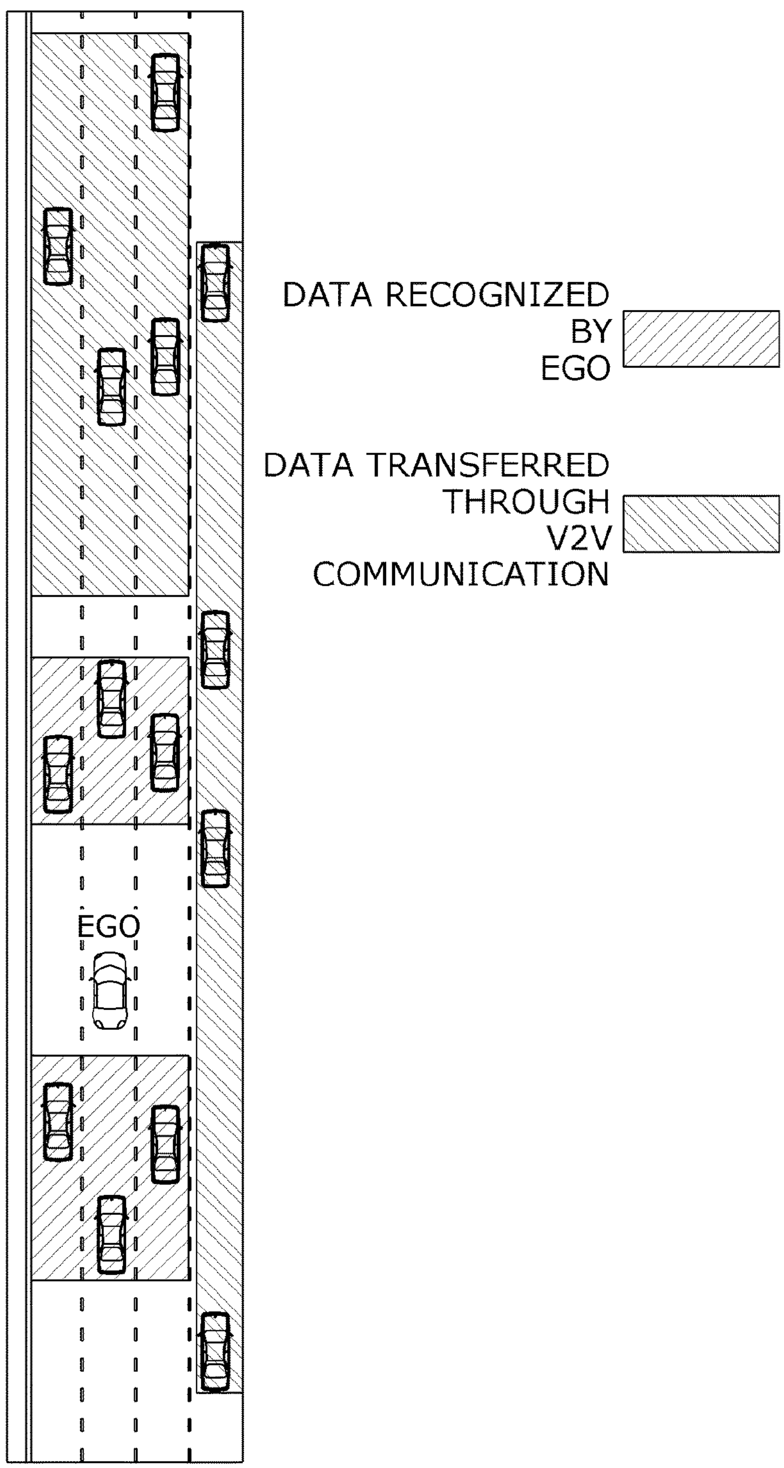
FIG. 5A and FIG. 5B is a second reference diagram illustrating a learning process using data acquired through V2V communication according to an exemplary embodiment of the present invention.
Figure 5B:
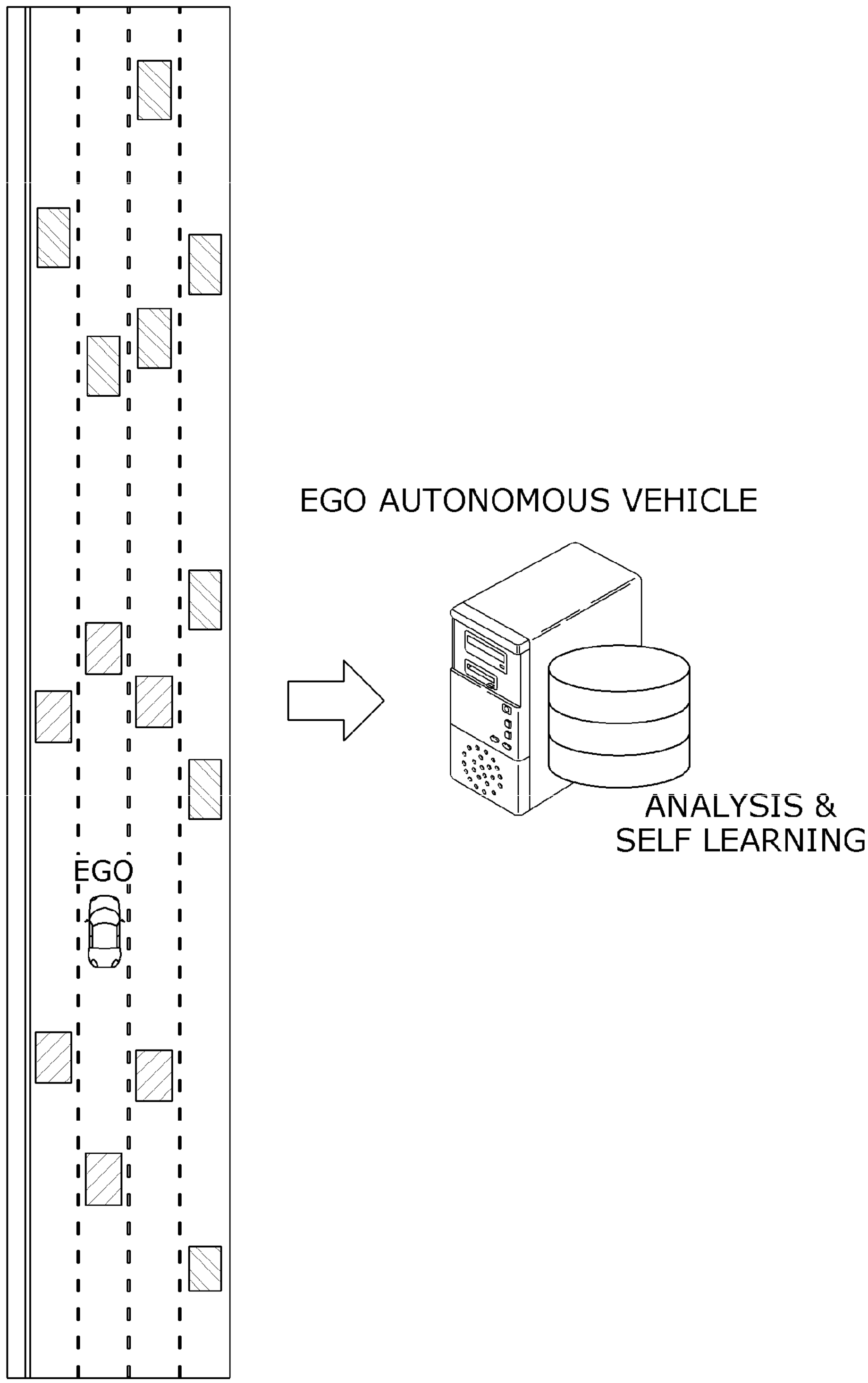

As shown in FIG. 5A, the learning section 150 may map data recognized by the autonomous vehicle (driving environment data of the autonomous vehicle) and data received through V2V communication (driving environment data of other vehicles) to the precise map data. In this way, sharing of driving environment data of other vehicles through V2V communication enables the learning section 150 to collect driving environment data for a wide area based on the autonomous vehicle in real time and to learn driving on the road using the collected driving environment data.

Figure 6:
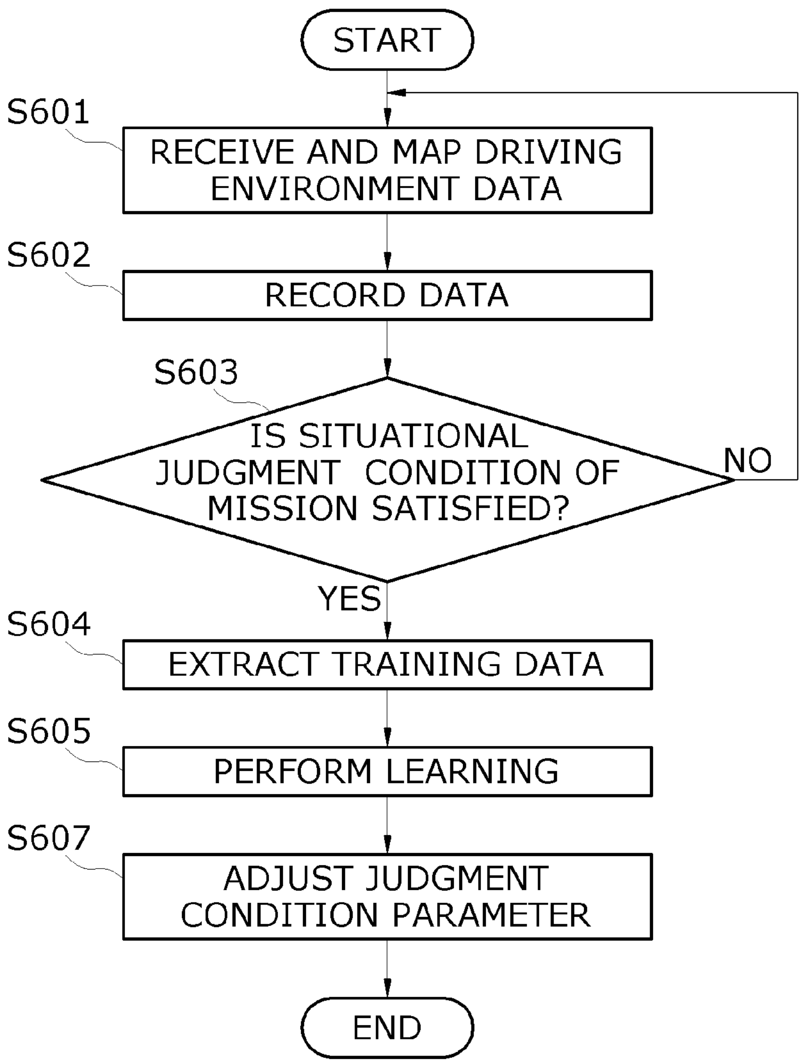
FIG. 6 is a third reference diagram illustrating a learning process using data acquired through V2V communication according to an exemplary embodiment of the present invention.

Specifically, real-time analysis and learning using shared driving environment data of other vehicles may be performed through a process shown in FIG. 6. A case of sharing and learning driving environment data using V2V communication will be described as an example below.

First, the learning section 150 receives driving environment data from other vehicles through V2V communication and maps the driving environment data together with driving environment data recognized by the autonomous vehicle (S601). Also, the learning section 150 records mapped data, that is, driving environment mapping data obtained by mapping the driving environment data of the other vehicles and the driving environment data of the autonomous vehicle to the precise map data (S602). It is necessary to log (record) the data in order to extract training data from some past data. At this time, the learning section 150 may log only some or all of the driving environment mapping data.

Subsequently, the learning section 150 determines whether a situational judgment condition of a driving mission is satisfied (S603). For convenience of description, it is assumed below that the driving mission is a lane change of a vehicle. Here, a lane change is necessary for a vehicle to make a left or right turn at an intersection, make a U-turn, or pass another vehicle. To perform a lane change, it is necessary to detect distances from a preceding vehicle in the traveling lane and preceding and following vehicles in a target lane and speeds of the vehicles.

Figure 7A:
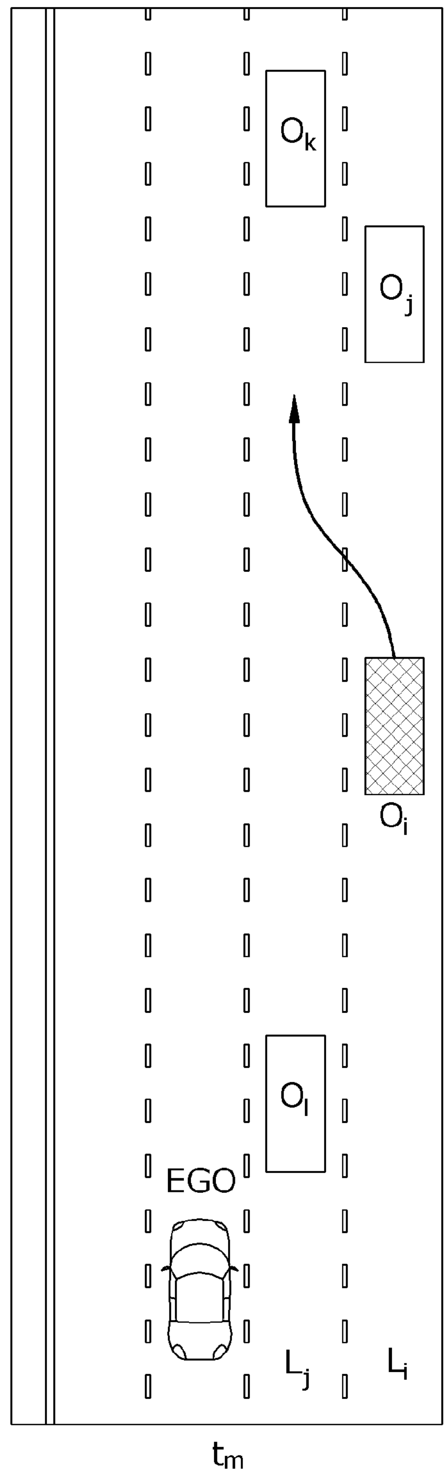
FIG. 7A and FIG. 7B is a fourth reference diagram illustrating a learning process using data acquired through V2V communication according to an exemplary embodiment of the present invention.
Figure 7B:
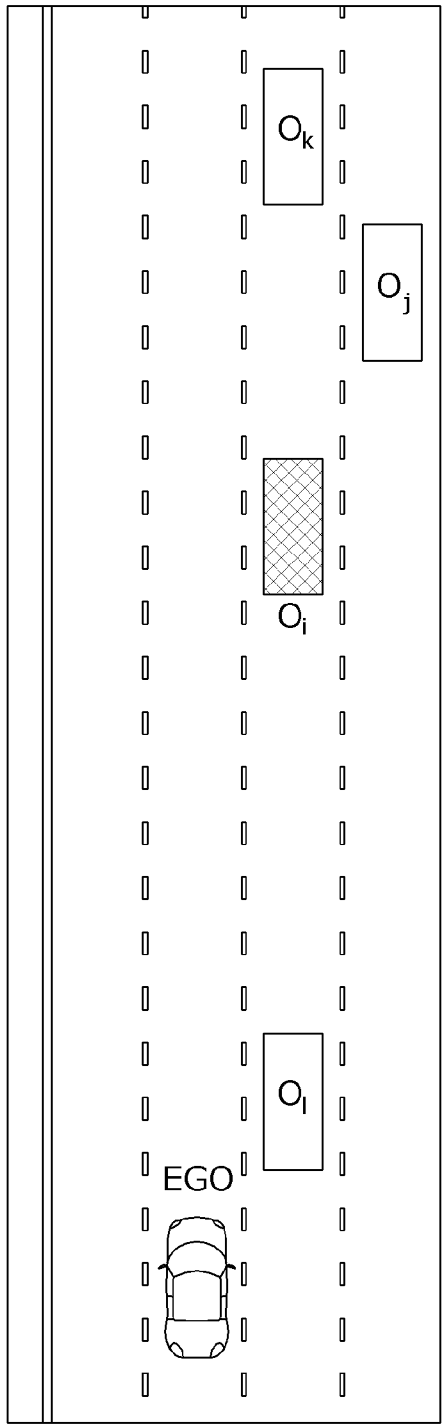

To determine whether the situational judgment condition of the driving mission is satisfied, the learning section 150 detects a vehicle which has changed lanes from the driving environment mapping data. A case shown in FIG. 7A and FIG. 7B will be described as an example.

The learning section 150 detects an arbitrary vehicle $O_i$ (autonomous vehicle) that travels in a lane L, at a time point $t_m$ which is an arbitrary time and travels in a lane $L_j$ at a subsequent time point $t_n$ (lane($O_i t_m$)≠lane($O_i t_m$)). Subsequently, the learning section 150 detects a preceding vehicle $O_j$ of the arbitrary vehicle $O_i$ in the traveling lane $L_i$ at the time point $t_m$ (a preceding vehicle before the lane change). Also, the learning section 150 detects a preceding vehicle $O_k$ (a preceding vehicle after the lane change) and a following vehicle $O_l$ in the lane $L_j$ to which the arbitrary vehicle $O_i$ has changed its lane at the time point $t_n$ at which the lane change has been made.

The learning section 150 calculates speed variations of the detected other vehicles $O_j$, $O_k$, and $O_l$ (the preceding vehicle before the lane change and the preceding and following vehicles after the lane change). The speed variations of the detected other vehicles may be $\Delta V(O_j)t_m$ to $t_n$, $\Delta V(O_k)t_m$ to $t_n$, and $\Delta V(O_l)t_m$ to $t_n$. Also, the learning section 150 calculates a speed variation $\Delta V(O_i)t_m$ to $t_n$ of the autonomous vehicle $O_i$. Here, the speed variations are calculated to execute the mission so that minimum speed variations of the other vehicles are caused by a lane change of the autonomous vehicle $O_i$, that is, traveling of the other vehicles is minimally hindered.

To determine whether the situational judgment condition of the driving mission is satisfied, the learning section 150 previously determines a threshold ΔV of a speed variation for minimizing a hindrance to traveling of the other vehicles, and compares the speed variations of the other vehicles $O_j$, $O_k$, and $O_l$ with the preset threshold value ΔV.

For example, when the speed variations of the other vehicles $O_j$, $O_k$, and $O_l$ do not exceed the threshold value ΔV ($\Delta V<\Delta V(O_j)t_m$ to $t_n$, $\Delta V(O_k)t_m$ to $t_n$, and $\Delta V(O_l)t_m$ to $t_n$), the learning section 150 determines that the situational judgment condition is satisfied. On the other hand, when the speed variations $\Delta V(O_j)t_m$ to $t_n$, $\Delta V(O_k)t_m$ to $t_n$, and $\Delta V(O_l)$ $t_m$ to $t_n$ of the other vehicles $O_j$, $O_k$, and $O_l$ exceed the threshold value ΔV, it is possible to determine that the vehicle $O_i$ has made an abrupt lane change and the situational judgment condition is not satisfied. When it is determined that the situational judgment condition is not satisfied, the corresponding data may be excluded from learning for autonomous driving.

Also, the learning section 150 may check a speed variation of the autonomous vehicle $O_i$ and determine whether sudden acceleration or sudden deceleration is performed during the lane change, thereby determining whether the situational judgment condition is satisfied. Here, sudden acceleration and sudden deceleration is required to improve travel convenience of a passenger as much as possible while traveling, and when a speed variation of the autonomous vehicle $O_i$ during a lane change is determined to be sudden acceleration or sudden deceleration, it is determined that a situational judgment condition is not satisfied, and the corresponding data may be excluded from learning for autonomous driving. For example, a criterion for determining whether sudden acceleration has been performed may be previously set to an acceleration of 1.5 $m/s^2$ or more, and a criterion for determining whether sudden deceleration has been performed may be previously set to a deceleration of 2.5 $m/s^2$ or less.

Figure 8A:
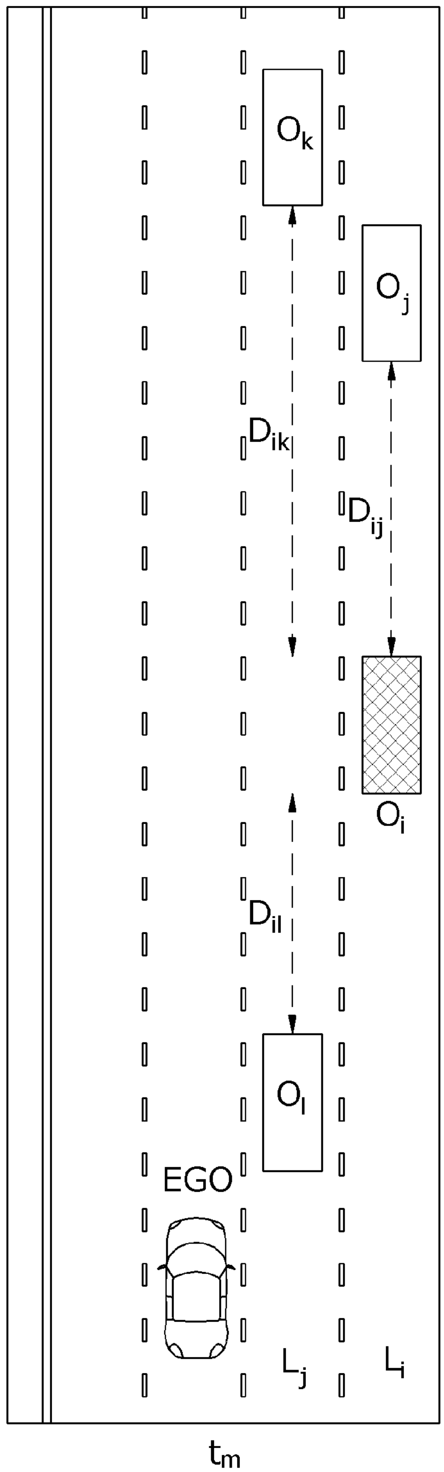
FIG. 8A and FIG. 8B is a fifth reference diagram illustrating a learning process using data acquired through V2V communication according to an exemplary embodiment of the present invention.
Figure 8B:
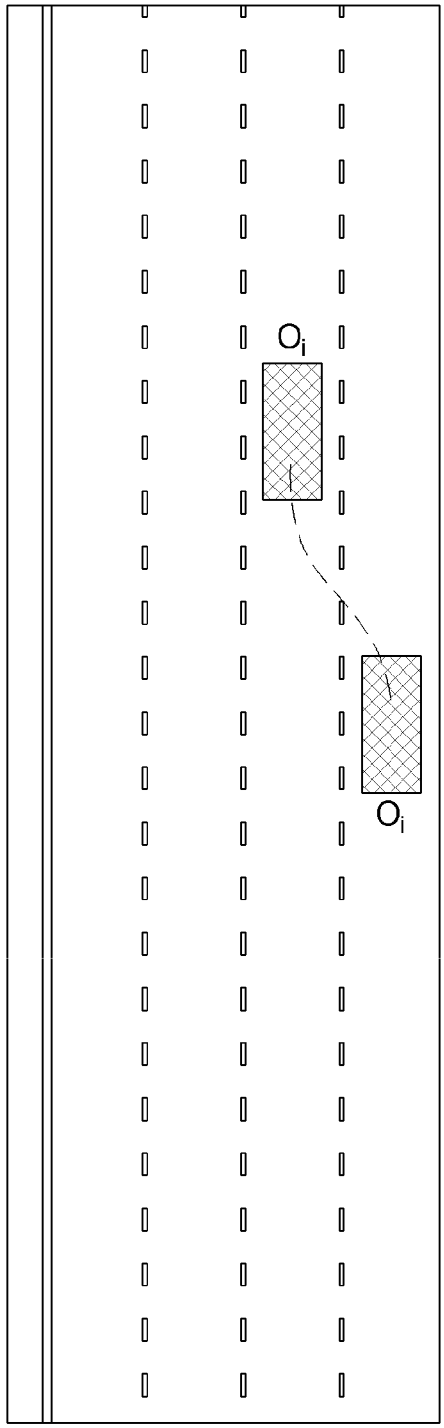

When it is determined in operation S603 that the situational judgment condition of the driving mission is satisfied, the learning section 150 extracts training data (S604). To perform learning, the learning section 150 may extract training data of the driving environment in which the lane change has succeeded between the time point $t_m$ and the time point $t_n$. Here, the training data of the lane change may include time-to-collisions (TTCs) between the autonomous vehicle $O_i$ and the other vehicles $O_j$, $O_k$, and $O_l$. As shown in FIG. 8A and FIG. 8B, a TTC may be calculated using a distance D between the autonomous vehicle $O_i$ and the preceding vehicle $O_j$ before the lane change and speeds of the autonomous vehicle $O_i$ and the preceding vehicle $O_j$ before the lane change. Likewise, the learning section 150 may calculate TTCs TTC($O_k$) and TTC($O_l$) of the preceding vehicle $O_k$ and the following vehicle $O_l$ after the lane change using distances $D_{ik}$ and $D_{il}$ between the autonomous vehicle $O_i$ and each of the preceding vehicle $O_k$ and the following vehicle $O_l$ after the lane change and speeds of the preceding vehicle $O_k$ and the following vehicle $O_l$ after the lane change.

A trajectory of the autonomous vehicle $O_i$ is a list of way points $\{wt_m, wt_{m+1}, \ldots, \text{and } wt_n\}$, and information on a way point may include an x coordinate and a y coordinate, which indicate a vehicle location, a vehicle heading, and a vehicle speed (x, y, θ, and V). The vehicle location may be determined by the location determiner 110, and the vehicle heading may be determined with vehicle information (vehicle body information, steering information, etc.).

Using the training data extracted through this process, the learning section 150 performs learning (S605), and adjusts the situational judgment condition (S606).

Figure 9:
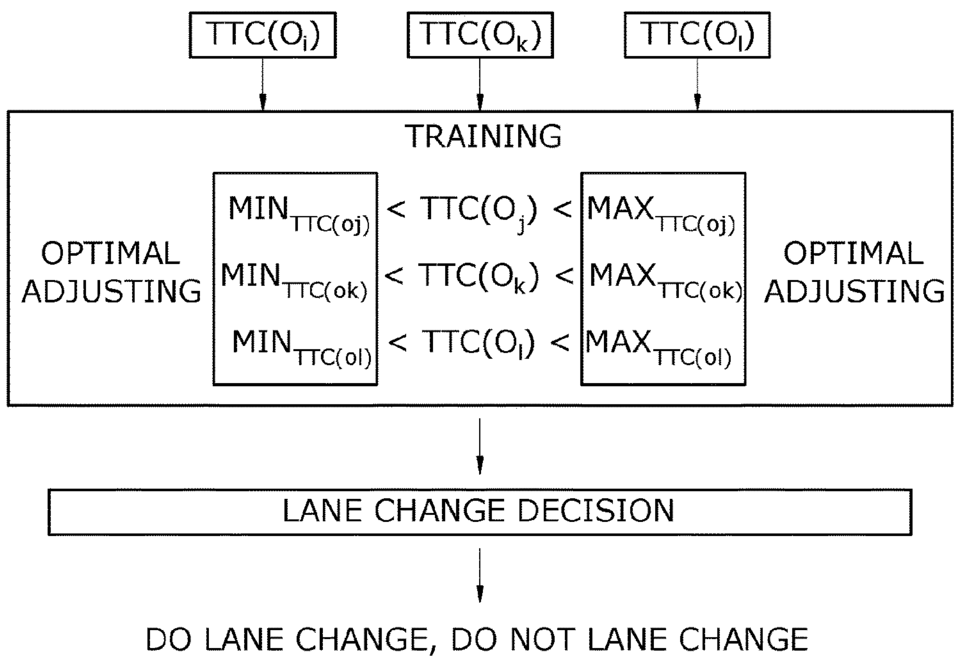
FIG. 9 is a sixth reference diagram illustrating a learning process using data acquired through V2V communication according to an exemplary embodiment of the present invention.

Using the training data acquired through the above process, the learning section 150 automatically adjusts condition values of a TTC of a preceding vehicle in the traveling lane and TTCs of preceding and following vehicles traveling in a target lane, and thus may make an optimal lane change decision and safely execute the lane change mission. For example, as shown in FIG. 9, a decision result is a boundary of a TTC value that is important for a lane change decision. In other words, the learning section 150 may find an optimal range of a minimum MIN and a maximum MAX of a TTC in which the autonomous vehicle can make a lane change through learning. Also, when it is determined to make a lane change, it is possible to refer to the trajectory in the training data to generate a path for the lane change. For example, it is possible to generate a local path for the lane change through a technique, such as curve smoothing, using a training trajectory suitable for a corresponding TTC value.

The learning section 150 adjusts a situational judgment condition of a driving mission, such as lane keeping, inter-vehicle distance keeping, passing through an intersection, or driving on a curved road, as well as the lane change mission through learning using driving environment data as mentioned above, and thus may execute a more skilled (safe and convenient) autonomous driving mission.

Meanwhile, the learning section 150 may receive a learning result from the cloud server through V2C communication of the communicator 130. The learning result received through V2C communication is a result of learning using driving environment data of other vehicles outside a V2V communication distance as well as other vehicles within the V2V communication distance, and it is possible to collect results of learning road environments of a wide area based on the autonomous vehicle in real time.

Figure 10:
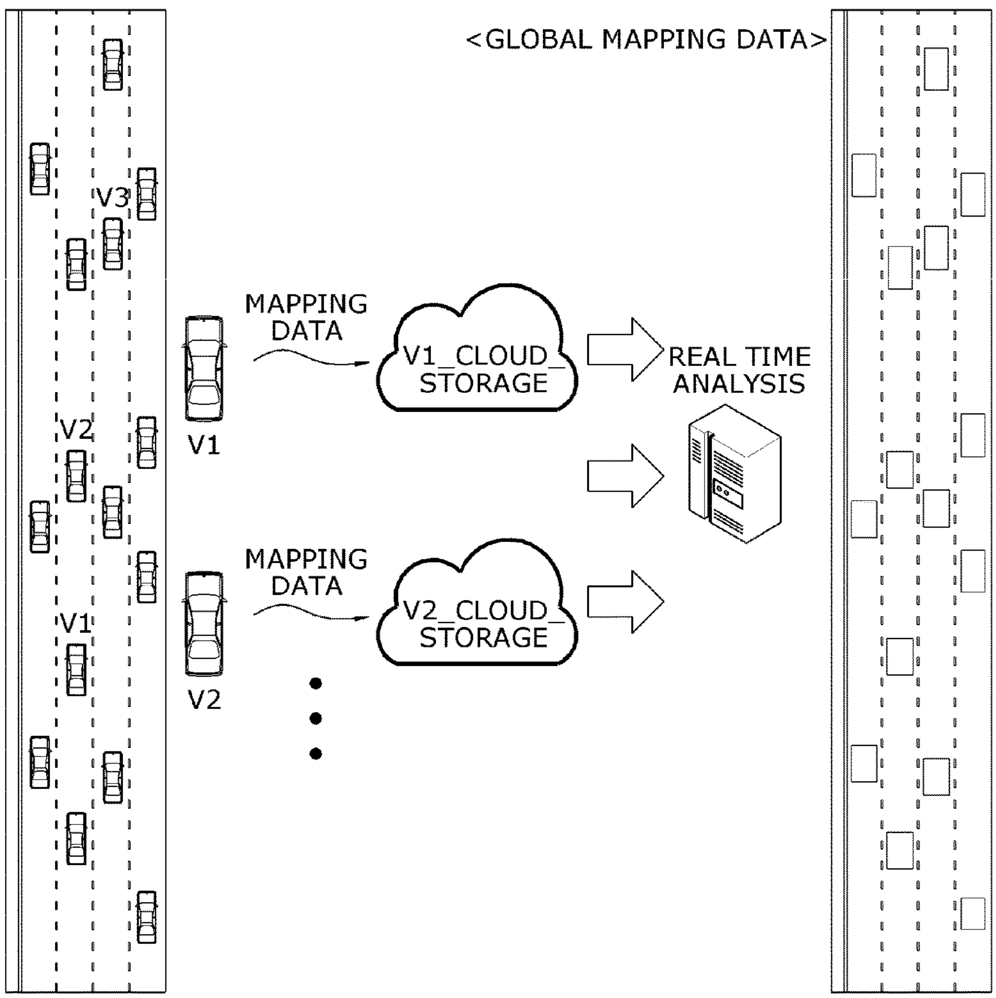
FIG. 10 is a first reference diagram illustrating a process of transmitting data and receiving a learning result through vehicle-to-cloud server (V2C) communication according to an exemplary embodiment of the present invention.

For example, as shown in FIG. 10, storages v1_cloud_storage, v2_cloud_storage, . . . in the cloud server are assigned to respective vehicles, and each vehicle v1, v2, . . . transmits driving environment data recognized by itself to its cloud storage in the cloud server. At this time, each vehicle may transmit mapping data obtained by mapping its driving environment data to its precise map data to the cloud server.

Figure 11:
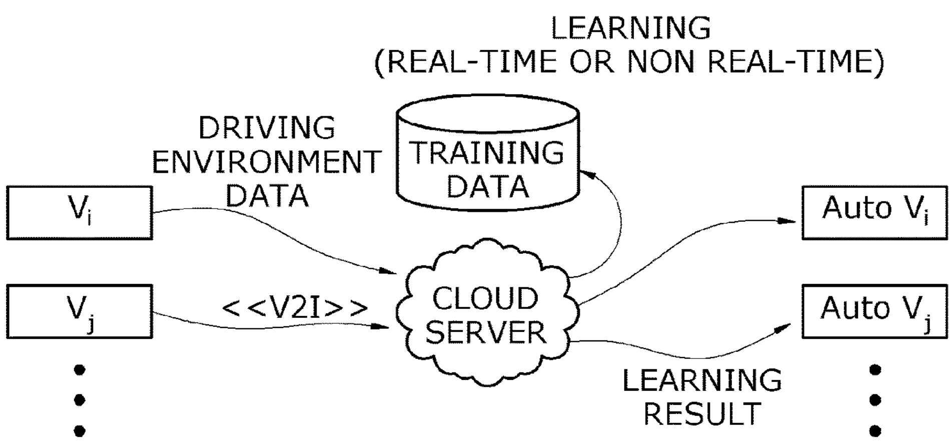
FIG. 11 is a second reference diagram illustrating a process of transmitting data and receiving a learning result through V2C communication according to an exemplary embodiment of the present invention.

Accordingly, the cloud server may generate global mapping data by performing a real-time analysis of data transmitted to the storages v1_cloud_storage, v2_cloud_storage, . . . . For example, as shown in FIG. 11, the cloud server may receive driving environment data from each of a plurality of vehicles $V_i$, $V_j$, . . . and generate global mapping data (training data) by learning the received driving environment data of the plurality of vehicles in real time or non-real time.

A result of the real-time analysis performed by the cloud server (learning result) may be transmitted to autonomous vehicles Auto $V_i$, Auto $V_j$, . . . . Here, the autonomous vehicles Auto $V_i$, Auto $V_j$, . . . may be the vehicles $V_i$, $V_j$, . . . that have transmitted their driving environment data to the cloud server. Accordingly, the autonomous vehicles Auto $V_i$, Auto $V_j$, . . . may use the learning result (global mapping data) received from the cloud server to perform autonomous driving or learning for autonomous driving.

Figure 12:
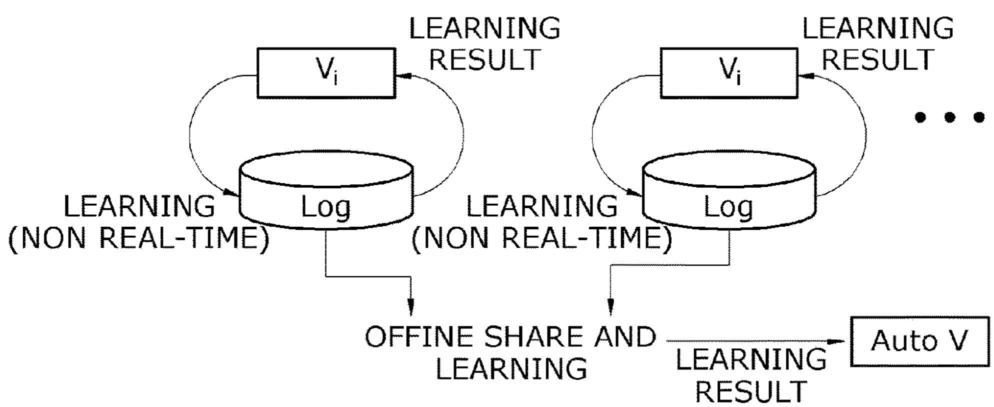
FIG. 12 is a reference diagram illustrating a process of extracting training data and subsequently performing learning according to an exemplary embodiment of the present invention when a driving mission is executed in an autonomous vehicle driven by a driver.

Alternatively, when the autonomous vehicle driven by a driver performs a driving mission, the learning section 150 may extract training data and subsequently perform learning without sharing driving environment data of other vehicles through V2V communication, V2C communication, or so on, that is, without performing learning using data of other vehicles or the cloud server in real time. Here, the driving mission may be a lane change, lane keeping, inter-vehicle distance keeping, passing through an intersection, and driving on a curved road, or so on. For example, when it is determined that a driving mission has been executed by driving of a driver, as shown in FIG. 12, a learning device installed in each of a plurality of vehicles may log training data acquired during the execution of the driving mission in a memory, and learning results of the plurality of vehicles may be stored in their memories and shared through offline media. The learning section 150 may merge the shared learning results to perform learning and achieve an effect.

As described above, according to exemplary embodiments of the present invention, driving environment data is acquired directly or from another vehicle or a cloud server and used to perform learning in the same way that an inexperienced driver, such as a new driver, becomes experienced through actual driving training and experience. Consequently, decision intelligence of an autonomous vehicle is improved through the learning, and it is possible to safely execute an optimal autonomous driving mission.

For example, according to exemplary embodiments of the present invention, it is possible to recognize obstacles (other vehicles) in a traveling lane and adjacent lanes using a sensor installed in an autonomous vehicle or a human-driven vehicle, share driving environment data by transmitting and receiving recognized information in real time through V2V communication or vehicle-to-infrastructure (V2I) communication, and perform real-time analysis and learning using real-time driving environment data shared among vehicles so that an optimal judgment and operational decision for ensuring safety can be made when an autonomous vehicle executes a driving mission.

Here, a learning result may be analyzed in a server in real time based on data shared through $V_2I$ communication and then implanted in an autonomous vehicle, or an optimal judgment may be made in an autonomous vehicle based on data shared through V2V communication through real-time analysis and learning. Alternatively, after driving environment data necessary for learning is logged and then collected, the collected driving environment data is analyzed so that a learning result can be implanted in an autonomous vehicle.

So far, a configuration of the present invention has been described in detail through exemplary embodiments of the present invention. However, the above description of the present invention is exemplary, and those of ordinary skill in the art should appreciate that the present invention can be easily carried out in other detailed forms without changing the technical spirit or essential characteristics of the present invention. Therefore, it should also be noted that the scope of the present invention is defined by the claims rather than the description of the present invention, and the meanings and ranges of the claims and all modifications derived from the concept of equivalents thereof fall within the scope of the present invention.

What is claimed is:

1. An apparatus for sharing and learning driving environment data to improve decision intelligence of an autonomous vehicle, the apparatus comprising:

at least one sensor configured to sense surrounding vehicles traveling within a preset distance from the autonomous vehicle;

a communicator transceiver configured to transmit and receive data between the autonomous vehicle and the surrounding vehicles or a cloud server;

a storage configured to store lane-level map data;

a learning computer configured to:

generate mapping data by mapping driving environment data of the autonomous vehicle obtained from a sensing result of the at least one sensor and driving environment data of the surrounding vehicles received through the communicator transceiver to the lane-level map data, determine whether a situational judgment condition of a driving mission is satisfied based on the mapping data, extract training data to perform the driving mission, and control driving of the autonomous vehicle with a learning result based on the extracted training data.

2. The apparatus of claim 1, wherein the driving environment data includes a current location and a speed of the autonomous vehicle, speeds of the at least one vehicle, and distances between the at least one vehicle and the autonomous vehicle.

3. The apparatus of claim 1, wherein the mapping data includes tracking identifiers (IDs) assigned to the surrounding vehicles, and includes speeds of the surrounding vehicles, distances between the surrounding vehicles and the autonomous vehicle, and traveling lanes of the surrounding vehicles, corresponding to the tracking IDs.

4. The apparatus of claim 1, wherein the communicator transceiver transmits the mapping data to the surrounding vehicles through vehicle-to-vehicle (V2V) communication or to the cloud server through vehicle-to-cloud server (V2C) communication.

5. The apparatus of claim 1, wherein the driving mission includes at least one of a lane change, lane keeping, inter-vehicle distance keeping, passing through an intersection, and driving on a curved road.

6. The apparatus of claim 1, wherein the learning computer receives the result of learning performed using driving environment data of a plurality of vehicles from the cloud server through the communicator transceiver, and uses the learning result in learning the driving mission.

7. The apparatus of claim 1, wherein, when the learning computer determines that the driving mission has been executed in the autonomous vehicle according to an operation of a driver of the autonomous vehicle, the learning computer records the training data acquired during the execution of the driving mission, merges the training data recorded in a plurality of vehicles, and performs the learning of the driving mission.

8. The apparatus of claim 1, wherein when the driving mission is lane change, the learning computer calculates speed variations of the surrounding vehicles based on the mapping data and compares the speed variations and a preset threshold, and wherein, when the speed variations are smaller than the preset threshold, the learning computer determines that the situational judgment condition is satisfied and extracts the training data including time-to-collision (TTC) between the autonomous vehicle and the surrounding vehicles and trajectory of the autonomous vehicle.

9. The apparatus of claim 1, wherein the learning computer adjusts the situational judgment condition based on the training data.

10. A method of sharing and learning driving environment data to improve decision intelligence of an autonomous vehicle, the method comprising:

sensing, by at least one sensor, surrounding vehicles traveling within a preset distance from the autonomous vehicle;

generating mapping data by mapping driving environment data obtained from a sensing result and driving environment data of the surrounding vehicles received through a communicator transceiver to pre-stored lane-level map data of a storage;

determining, by a learning computer, whether a situational judgment condition of a driving mission is satisfied based on the mapping data;

extracting training data, by the learning computer;

generating a learning result based on the extracted training data; and controlling driving of the autonomous vehicle using the learning result.

11. The method of claim 10, wherein the driving environment data includes a current location and a speed of the autonomous vehicle, speeds of the surrounding vehicles, and distances between the surrounding vehicles and the autonomous vehicle.

12. The method of claim 10, wherein the mapping data includes tracking identifiers (IDs) assigned to the surrounding vehicles, and includes speeds of the surrounding vehicles, distances between the surrounding vehicles and the autonomous vehicle, and traveling lanes of the surrounding vehicles, corresponding to the tracking IDs.

13. The method of claim 10, further comprising at least one of:

sharing the mapping data with the surrounding vehicles through wireless communication by transmitting the mapping data through vehicle-to-vehicle (V2V) communication; and sharing the mapping data with a cloud server through wireless communication by transmitting the mapping data through vehicle-to-cloud server (V2C) communication.

14. The method of claim 10, wherein the driving mission includes at least one of a lane change, lane keeping, inter-vehicle distance keeping, passing through an intersection, and driving on a curved road.

15. The method of claim 10, wherein generating the learning result comprises receiving a result of learning performed using driving environment data of a plurality of vehicles from a cloud server through the communicator transceiver and using the learning result in learning the driving mission.

16. The method of claim 10, wherein generating the learning result comprises, when the learning computer determines that the driving mission has been executed in the autonomous vehicle according to an operation of a driver of the autonomous vehicle, recording training data acquired during the execution of the driving mission, merging training data recorded in a plurality of vehicles, and performing the learning of the driving mission.

17. The method of claim 10, wherein the driving mission is lane change, and wherein generating the learning result comprises:

calculating, by the learning computer, speed variations of the surrounding vehicles based on the mapping data;

comparing, by the learning computer, the speed variations of the surrounding vehicles and a preset threshold;

determining, by the learning computer, that the situational judgment condition is satisfied, when the speed variations are smaller than the preset threshold; and extracting, by the learning computer, the training data including time-to-collision (TTC) between the autonomous vehicle and the surrounding vehicles and trajectory of the autonomous vehicle.

* * * * *